Figure 3:
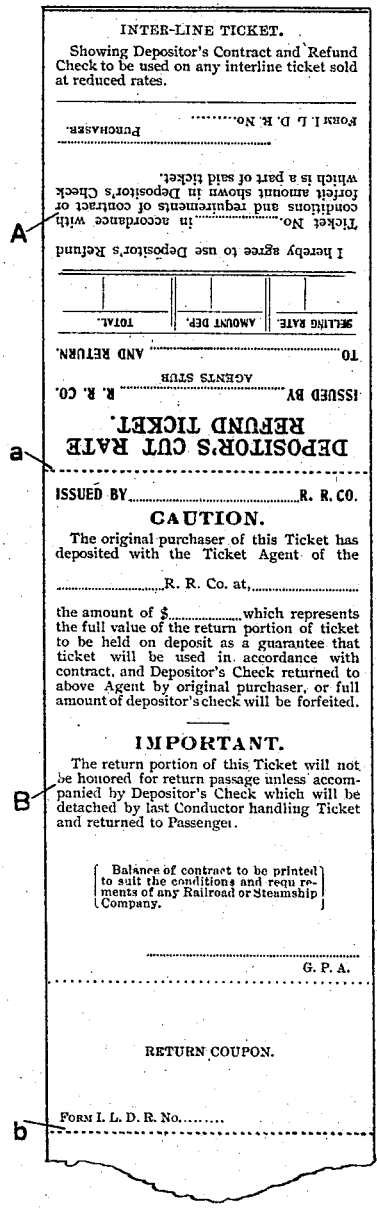

No. 764,854. PATENTED JULY 12, 1904.
J. H. LORD.
RAILWAY TICKET.
APPLICATION FILED JAN. 16, 1904.

NO MODEL. 3 SHEETS—SHEET 1.

Fig. 1

LOCAL TICKET.

Showing Depositor's Refund Contract and Refund Check to be used on any local ticket sold at reduced rates.

PURCHASER.......... FORM D. R. No..........

I hereby agree to use Depositor's Refund Ticket No.......... in accordance with conditions and requirements of this contract or forfeit the amount shown in the Depositor's Check which is a part of said ticket.

| SELLING RATE. | AMOUNT DEP. | TOTAL. |

TO .......... AND RETURN.

AGENT'S STUB

ISSUED BY .......... R. R. CO.

DEPOSITOR'S CUT RATE REFUND TICKET.

ISSUED BY .......................... R. R. CO

CAUTION.

The original purchaser of this Ticket has deposited with the Ticket Agent of the .......... R. R. Co. at .........., the amount of $.......... which represents the full value of the return portion of ticket to be held on deposit as a guarantee that ticket will be used in accordance with contract, and Depositor's Check returned to above Agent by original purchaser, or full amount of depositor's check will be forfeited.

IMPORTANT.

The return portion of this Ticket will not be honored for return passage unless accompanied by Depositor's Check which will be detached by last Conductor handling Ticket and returned to Passenger.

{ Balance of contract to be printed to suit the conditions and requirements of any Railroad or Steamship Company. }

.......... G. P. A.

To be detached and retained by the Conductor returning.

RETURN COUPON.

FORM D. R. No..........

Fig. 2

(Local Ticket Continued).

Depositor's Check to be detached by last Conductor handling ticket and given to Passenger to .......... and Return.

FORM D. R. No..........

DEPOSITOR'S CHECK.

※TO BE REMITTED AS CASH BY AGENT HONORING SAME.

This Check returned to the Ticket Agent of the .......... on or before .........., 19.......... by the original purchaser will be honored for R. R. Co. at.......... a refund of $..........

G. P. A.

I certify on honor that I am the original purchaser of Depositor's Ticket No.........., and I hereby acknowledge receipt in full of the above refund.

WITNESS:

.......... PURCHASER.

.......... AGENT.

To be detached and retained by Conductor going.

GOING COUPON.

FORM D. R. No..........

WITNESSES
*Julia Tarrent*
*Victor George Jr*

INVENTOR
*John H. Lord*
BY ATTY. *N. DuBois*

No. 764,854. PATENTED JULY 12, 1904.
J. H. LORD.
RAILWAY TICKET.
APPLICATION FILED JAN. 16, 1904.
NO MODEL. 3 SHEETS—SHEET 2.

WITNESSES
Julia Tarrent
Victor George Jr

INVENTOR
John H Lord
BY ATTY. N DuBois

No. 764,854. PATENTED JULY 12, 1904.
J. H. LORD.
RAILWAY TICKET.
APPLICATION FILED JAN. 16, 1904.
NO MODEL. 3 SHEETS—SHEET 3.

Fig. 5

PASTER REFUND CONTRACT.

To be used on any Interline Ticket by detaching Original Contract and substituting Depositor's Contract, also placing Refund Check between Going and Returning Coupons.

FORM P. C. D. R.—USED WITH FORM No..........

PURCHASER..........

Ticket No.......... in accordance with conditions and requirements of contract or forfeit amount shown in Depositor's Check which is a part of said ticket.

I hereby agree to use Depositor's Refund

| SELLING RATE. | AMOUNT DEP. | TOTAL. |
|---|---|---|

TO.......... AND RETURN.

AGENTS STUB

ISSUED BY.......... R. R. CO.

DEPOSITOR'S CUT RATE REFUND TICKET.

ISSUED BY.......... R. R. CO

CAUTION.

The original purchaser of this Ticket has deposited with the Ticket Agent of the ..........R. R. Co. at..........

the amount of $.......... which represents the full value of the return portion of ticket to be held on deposit as a guarantee that ticket will be used in accordance with contract, and Depositor's Check returned to above Agent by original purchaser, or full amount of depositor's check will be forfeited.

IMPORTANT.

The return portion of this Ticket will not be honored for return passage unless accompanied by Depositor's Check which will be detached by last Conductor handling Ticket and returned to Passenger.

{ Balance of contract to be printed to suit the conditions and requirements of any Railroad or Steamship Company. }

FORM P. C. D. R. No.......... G. P. A

GUMMED END.

Fig. 6.

(Paster Contract Continued).

GUMMED END.

Depositor's Check to be detached by last Conductor handling ticket and given to Passenger to..........and Return.

FORM PASTER CONTRACT D. R.—USED WITH FORM No. ......

DEPOSITOR'S CHECK.

☞ TO BE REMITTED AS CASH BY AGENT HONORING SAME.

This Check returned to the Ticket Agent of the.......... on or before.........., 19.........., by the original purchaser will be honored for R. R. Co. at.......... a refund of $..........

G. P. A.

I certify on honor that I am the original purchaser of Depositor's Ticket No.........., and I hereby acknowledge receipt in full of the above refund.

PURCHASER..........

WITNESS:..........

AGENT..........

GUMMED END.

WITNESSES
*Julia Tarrent*
*Victor Georg Jr*

INVENTOR
*John H. Lord*
BY ATTY. *N. Du Bois*

No. 764,854.                                                                 Patented July 12, 1904.

UNITED STATES PATENT OFFICE.

JOHN H. LORD, OF SPRINGFIELD, ILLINOIS.

RAILWAY-TICKET.

SPECIFICATION forming part of Letters Patent No. 764,854, dated July 12, 1904.

Application filed January 16, 1904. Serial No. 189,264. (No model.)

*To all whom it may concern:*

Be it known that I, JOHN H. LORD, a citizen of the United States, residing at Springfield, Sangamon county, Illinois, have invented certain new and useful Improvements in Railway-Tickets, of which the following is such a full, clear, and exact description as will enable others skilled in the art to which it appertains to make and use my said invention.

My invention relates to round-trip tickets such as are used by railroad companies, steamship lines, or other carriers of passengers.

The purposes of my invention are to provide a depositor's cut-rate refund-ticket adapted for use for a local round trip on a single line or adapted for use as an interline round-trip ticket sold at reduced rates by any railroad or other transportation company associated with other companies in the transportation of passengers, to provide a ticket so constructed and arranged that the identification of the passenger by the selling agent shall be positive, and so constructed and arranged as not to require identification of the passenger by the conductor, and also constructed and arranged so that the ticket cannot have any speculative value if retained by the conductor, and therefore will not pass from the conductor to a broker or any other unauthorized person for illegitimate use of the ticket, and to provide in connection with a railroad-ticket means to facilitate the signing and delivery of the ticket, also means adapting the special contract embodied in this ticket for use in connection with other tickets by means of pasters, as hereinafter described.

With these ends in view my invention consists in a railway-ticket embodying the novel features of construction and arrangement shown in the annexed drawings, to which reference is hereby made and hereinafter particularly described, and finally recited in the claims.

Figure 4:
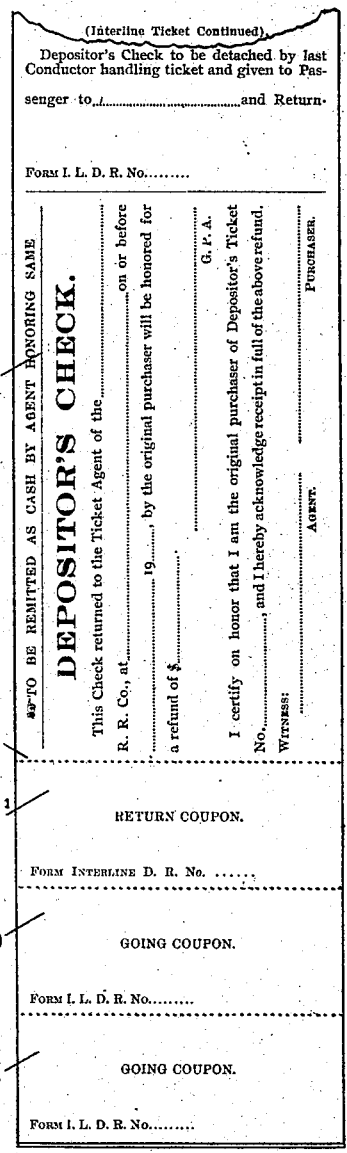

Referring to the drawings, in which similar reference-letters designate like features of construction and arrangement, Figures 1 and 2 are respectively a face view of the upper part and the lower part of a local ticket embodying a depositor's contract, an agent's stub, and a refund-check. Figs. 3 and 4 are respectively a face view of the upper part and the lower part of an interline ticket embodying the same features. Figs. 5 and 6 are respectively a face view of the upper and the lower part of an interline ticket adapted for use with pasters.

Similar letters designate like parts in all of the views.

The ticket hereinafter described is intended only for round trips for which special rates are made, and the ticket is capable of use either on a single line of transportation or on any two or more of a number of associated lines.

The ticket shown in Fig. 1 consists of four parts, designated by the characters A, B, C, and D, respectively. Perforations $a$, $b$, and $c$ extend across the ticket, so that the parts may be conveniently separated in use. The purchaser's contract A embraces the contract which is to be signed by the purchaser (designated as the depositor) and contains an agreement to use the depositor's refund-ticket in accordance with the conditions and requirements of the contract or forfeit the amount shown by the depositor's check. It also embraces a blank space for the insertion of the name of the railroad company selling the ticket, a blank for the insertion of the point of destination, the selling rate, the amount of the deposit and the total amount, the number of the ticket, and a blank for the signature of the purchaser. The position of the part A is inverted relative to the other parts of the ticket—that is to say, when the ticket is held in position for reading the member B the part A will appear upside down. There is a practical advantage in this inverted arrangement, as will hereinafter fully appear. The part B (designated as the seller's contract) has a blank for the insertion of the name of the railroad company and contains a caution to the purchaser as to the conditions of purchase, a blank for the insertion of the name of the railroad company with which the deposit is made, the place of sale, and the amount of the deposit. The part B also has a notification that the "return portion of the ticket will not be honored for return passage unless accompanied by the depositor's check, which will be detached by the last conductor handling the ticket and returned to the passenger." The part B also contains a blank space reserved for printing any special conditions of contract to suit the requirements of any transportation company using the ticket and also embraces a blank for the signature of the general passenger agent or other authorized official of the selling company. It also embraces a return-coupon good for return passage when presented in connection with the depositor's check, but not good otherwise. The part C (designated as the depositor's check) embraces a notification that the depositors' check is to be detached by the last conductor handling the ticket and given to the passenger. It also contains a blank for the insertion of the place of destination. The body of the depositor's check embraces a notification that the check is to be remitted as cash by the agent honoring same. It also contains a blank space for the insertion of the name of the selling company, the place of sale, the date on or before which presentation must be made for payment, the amount of refund, and the signature of the general passenger agent of the transportation company selling the ticket. It also contains a certificate to be signed by the purchaser certifying that he is the original purchaser of the ticket, specifying the number of the ticket, and acknowledgment of receipt in full of the refund. It also contains a blank for the signature of the agent, who signs as a witness to the signature of the purchaser. Form D embraces a going-coupon, to be taken up by the conductor on presentation of the ticket. As a means for convenient and safe identification of the several parts of the ticket the parts A B C D each has the same form designation—viz., "D. R."—and a blank for the insertion of the serial number of the ticket, this form designation being the same in all of the parts of the same ticket. The initial letters "D. R." in this case signify the depositor's refund. The selling agent writes the serial number on each of the parts A B C D opposite the "D. R." number, so that the number will identify any of the parts detached by the conductor and transmitted to the auditor, and the parts transmitted to the auditor by the selling agent will all bear the same number and may be readily identified.

The modified form shown in Figs. 3 and 4 embraces all of the parts A B C D substantially the same as the local ticket already described, except that the form of the interline ticket is designated by the initials "I. L. D. R.," signifying "interline deposit refund." This ticket also contains an additional going-coupon E and an additional return-coupon E' where the ticket is for use on one line only in addition to the selling line. To make this ticket available for more than one line other than the selling line, a going-coupon and a return-coupon may be added for each additional line.

The modified form of the ticket shown in Figs. 5 and 6 is designed to make the ticket available in connection with the stock of standard tickets which the transportation company may already have on hand. As a matter of convenience I designate this form of the ticket as a "paster contract-ticket." In the form of the ticket illustrated in Figs. 5 and 6 the part A embodies in addition to the matter already described a notification that it embraces a paster refund-contract, a paster refund-check to be used on any interline ticket by detaching original contract and substituting the depositor's contract and also placing refund-check between going and returning coupons. In this form of the ticket the part B is without any return-coupon and the lower end of the part is gummed. The upper and the lower parts of the part C are likewise gummed. The part D is not used in tickets of this form. Perforations $d$ extend across the ticket between the parts B and C. Tickets of the form shown in Figs. 5 and 6 bear the form designation "P. C. D. R.," signifying paster contract depositor's refund. The parts A and C also contain a blank for inserting the number of the standard form of the ticket of the selling transportation company with which the refund-contract is used.

The method of selling and using the local round-trip ticket is as follows: Let it be assumed that the selling transportation company is offering a special round-trip rate from "X" to "Z" and return for the sum of one dollar, the regular one-fare rate from "X" to "Z" being three dollars. The passenger wishing to avail himself of the special rate will pay to the local ticket agent the special round-trip fare of one dollar and will also deposit with the local agent one full single fare, three dollars, to be refunded to the depositor upon presentation of the depositor's check. It will be observed that under this arrangement the amount paid by the purchaser for the round trip, including the deposit, is less than the single fare both ways from "X" to "Z" and return. Hence this payment may be made without violating any law prescribing that for a certain number of miles to be traveled the transportation company shall not collect an amount in excess of the number of miles multiplied by the lawful rate per mile. Upon payment of the specified amount the selling agent inscribes on the part A the name of the issuing company, the place of destination, the selling rate, the amount of deposit, the total amount received, and the serial number of the ticket. He then presents this contract to the purchaser for signature. The part A being inverted relative to the parts B, C, and D, greatly facilitates the filling in of the other parts of the ticket by the agent. The selling of transportation-tickets must be done rapidly on account of limited time. The contract is usually filled up and pushed through the ticket-office window to be signed by the purchaser. To accomplish this with tickets as constructed prior to my invention, the ticket must be turned end for end, so that the purchaser may see where to sign and what he is signing. In my ticket the part A is already inverted relative to the other parts, so that the part A may be pushed outward through the window into position to be signed by the purchaser without hindering or delaying the filling in of the other parts of the ticket by the selling agent. This device is of special practical advantage in the rush incident to conducting large excursions for which special round-trip rates are usually made. The selling agent tears the ticket along the perforations $a$, retains the part A, and delivers the connected parts B, C, and D to the purchaser. Upon presenting the ticket to the conductor he tears along the perforations $c$, thereby detaching the going-coupon D, numbered to correspond with the ticket, and then returns the connected parts B and C to the passenger. Upon the return passage the conductor tears across the ticket along the perforations $b$. The conductor retains the part B and returns the depositor's check C to the passenger. By reason of the peculiar construction and arrangement of the ticket the separating of the parts B and C absolutely cancels the ticket, so that it cannot again be used and will have no value whatever in the hands of any unauthorized person. This feature is of the essence of my invention. It is an absolute safeguard against fraud by the conductor, and it puts the purchaser on his guard to see that the conductor detaches the depositor's check and returns it to the purchaser, for otherwise the purchaser will not obtain the refund, to which he is entitled only upon presentation of the depositor's check. Upon his return to the starting-point the passenger presents his depositor's check at the local office where the ticket was purchased, signs his name thereto, and it is immediately cashed by the local agent at the refund value shown by the depositor's check, in this case three dollars. The local agent then sends in to the auditor the depositor's check as a voucher for the disbursement by the agent.

From the foregoing it will be seen that the practical advantages of the described form of ticket are that the inverted stub facilitates the signing of the ticket, and the relative position of the parts B and C is such that separating them completely cancels the ticket and makes the part D invalid and unavailable under any condition for further use.

The form of ticket shown in Figs. 3 and 4 is identical with that shown in Figs. 1 and 2 except that additional going and returning coupons are provided. The use of the ticket is exactly the same.

Tickets of the form shown in Figs. 5 and 6 have a practical advantage that they are available for use with stock tickets of standard forms used in the local office. In issuing a ticket of this form the local ticket agent tears across the ticket along the perforations $d$, thereby separating the parts B and C. He then moistens the upper end of the return coupon or coupons detached from the standard ticket of the stock ticket of the local office and applies it to the gummed lower part B. He then moistens the lower part of the return-coupon and applies it to the upper gummed part of part C. He then in like manner applies the return coupon or coupons on the lower gummed part of the part C. The use of this form of the ticket is identical with that of the use of the other forms.

The depositor's check is detached by the conductor and returned to the passenger, who presents the same to the local agent from whom it was purchased and receives the refund, as already described.

It will be observed that this ticket does not relate to a rebate payable only on condition of traveling a predetermined number of miles, but relates only to the refund of a deposit made by the purchaser. The refund is payable in full without reference to mileage traveled.

The depositor's check is of value only to the depositor himself, and it is therefore to his interest to see that the conductor detaches it and returns it to him. The part or parts of the ticket held by the conductor have no value and cannot be used by any person other than the purchaser. The identification of the purchaser is absolute, and the conductor has no responsibility whatever in identifying the passenger.

Having fully described my invention, what I claim as new, and desire to secure by Letters Patent, is—

1. A railway-ticket embracing a depositor's contract signed by the purchaser, a seller's contract signed by a representative of the selling company and embracing a return-coupon, a depositor's check connected with said seller's contract, and a going-coupon connected with said depositor's check; said seller's contract embracing a stipulation to the effect that the return portion of the ticket will not be honored for return passage unless accompanied by the depositor's check, as set forth.

2. A railway-ticket embracing a depositor's contract, appropriately designated for signature by the purchaser, a seller's contract appropriately designated for signature by a representative of the selling company and embodying a return-coupon; and a depositor's check appropriately designated for signature by a representative of the seller and setting forth that it will be honored for the predetermined refund, also embodying a certificate appropriately designated for signature by the original purchaser, as set forth.

3. A railway-ticket embracing a depositor's contract appropriately designated for signature by the purchaser and containing a stipulation to use the ticket in accordance with the conditions and requirements of the contract or forfeit the amount shown in the depositor's check which is a part of said ticket; a seller's contract appropriately designated for signature by a representative of the selling company and embracing a return-coupon; a depositor's check appropriately designated for signature by a representative of the selling company and containing a stipulation that said check returned to the agent of the company, will be honored for a refund, also embracing a certificate and a receipt appropriately designated for signature by the purchaser, and a going-coupon connected with said depositor's check, as set forth.

In witness whereof I have hereunto subscribed my name, at Springfield, Illinois, this 6th day of January, 1904.

JOHN H. LORD.

Witnesses:
  J. A. BOYCE,
  MAY F. RYAN.